United States Patent [19]

Bartholomew

[11] Patent Number: 5,546,985
[45] Date of Patent: Aug. 20, 1996

[54] QUICK CONNECT FLUID COUPLING

[75] Inventor: Donald D. Bartholomew, Mt. Clemens, Mich.

[73] Assignee: Proprietary Technology, Inc., Bloomfield Hills, Mich.

[21] Appl. No.: 406,973

[22] PCT Filed: Sep. 21, 1992

[86] PCT No.: PCT/US92/07999

§ 371 Date: Mar. 17, 1995

§ 102(e) Date: Mar. 17, 1995

[87] PCT Pub. No.: WO94/07078

PCT Pub. Date: Mar. 31, 1994

[51] Int. Cl.⁶ .............................. F16L 37/26; F16L 37/28
[52] U.S. Cl. .............................. 137/614.04; 137/614.03; 251/149.6
[58] Field of Search .................. 137/614.03, 614.04, 137/614.05; 251/149.6

[56] References Cited

U.S. PATENT DOCUMENTS

| 2,471,237 | 5/1949 | Pasturczak | 137/614.03 |
|---|---|---|---|
| 2,753,195 | 7/1956 | Palmer | 137/614.03 |
| 2,854,259 | 9/1958 | Clark | 137/614.03 |
| 3,474,827 | 10/1969 | Torres | 137/614.06 |
| 3,575,221 | 4/1971 | Mochizuki et al. | 251/149.6 |
| 3,613,726 | 10/1971 | Torres | 137/614.03 |
| 4,327,770 | 5/1982 | Brown et al. | 137/614.03 |
| 4,819,908 | 4/1989 | Norkey | 251/149.6 |
| 4,936,345 | 6/1990 | Nix | 137/614.03 |
| 4,991,627 | 2/1991 | Nix | 137/614.03 |

FOREIGN PATENT DOCUMENTS

| 318678 | 1/1957 | Switzerland | 137/614.03 |
|---|---|---|---|
| 505681 | 5/1939 | United Kingdom | 137/614.03 |

Primary Examiner—A. Michael Chambers
Attorney, Agent, or Firm—Harness, Dickey & Pierce, P.L.C.

[57] ABSTRACT

A connection 10 for a piping system where non-threaded means are utilized for securing a male portion 14 to a female portion 12, and where sealing of the male portion to the female portion is accomplished by a seal 68, 70 which seals the outside surface of the male portion to the inside of the female portion, a blocking valve 22, 72 in each the male and female portion which is operated by means 38 associated with the female portion blocking valve 72, whereby when the connection is separated, also seals the male portion, and wherein the male portion is also sealed within the female portion before the blocking valves 22, 27 in each the male and female portion open to permit flow through the connection 10.

27 Claims, 3 Drawing Sheets

QUICK CONNECT FLUID COUPLING

BACKGROUND AND SUMMARY OF THE INVENTION

The present invention relates generally to a quick connect fluid coupling between mateable plug and socket fluid connectors and, more particularly, to a pressure confining blocking valve arrangement that is operable to prevent fluid flow when in a first position and the connectors are uncoupled, and seals the male portion as the connection is mated, then as this male is latched into the female of the connectors opens thereby to pass fluid therebetween.

"Quick Connect Fluid Couplings" U.S. Pat. No. 4,819,908, issued Apr. 11, 1989 discloses a socket connector provided with a valve member and a plug connector that is manually inserted into the socket in order to establish fluid communication therebetween. Upon insertion, the plug engages and moves the valve member from a closed to an open position. Simultaneously therewith a locking mechanism and a seal assembly associated with the socket, respectively, locks the connectors together and seals the mated connectors against leakage.

However, the seal assembly can still have fluid leakage, such as upon the separation of the plug from the socket. For example, as noted by U.S. Pat. No. 4,819,908, only the socket is provided with a shut-off valve to prevent fluid loss when the plug member is detached from the socket member. The plug is not fitted with a flow preventing shut-off valve. A disadvantage of a design that uses only one valve is that a great amount of the fluid medium which is confined by the piping system can be lost upon the separation of the members. Also, air and other material may be introduced into a system which does not utilize dual shut-off valves.

Accordingly, a primary object of the present invention is to provide a quick connect fluid coupling assembly with a fluid shut-off valve arrangement to prevent the release of the fluid medium operable when the individual fluid connector members are disconnected and when the connector members are connected.

It is another object of the present invention to provide connectable plug and socket conduits of a quick connect fluid coupling with separate fluid blocking valves which operate to prevent fluid flow when disconnected and open upon the connection of the plug to the socket to permit flow.

In addition, it is an object of the present invention to provide a fluid connector assembly which inhibits the entry of foreign objects, such as dirt, into the fluid connection system. An object of the invention is to provide a blocking valve that avoids having a spring force applied in a manner which will squeeze a seal in a manner that would cause the seal material to creep and have a smaller diameter inside diameter.

Another object of the present invention is to provide a fluid connector assembly which requires only a one-step snapping connection to open the dual blocking valves.

It is yet another object of the present invention to provide an improved seal retainer means which operates both to secure the blocking valve of the socket within the axial bore of the socket housing, and to retain the bushings, sealing rings and female blocking valve means within the axial bore of the female housing.

To achieve the foregoing objects, the present invention provides a quick connect fluid connector assembly comprising a pair of fluid conduits adapted to be releasably connected and disposed in fluid communication with one another. According to this invention, a socket fluid conduit is sized to receive the forward end portion of a plug fluid conduit inserted longitudinally inwardly of the socket. The plug and socket fluid conduits generally comprise respective tubular housings, each receiving a respective blocking valve which normally operates to prevent fluid flow from the housing until the conduits are in a fully sealed connection. The plug and socket valves open during mating of the conduits with the plug conduit operating to open the socket blocking valve and the socket valve operating to open the plug valve when a predetermined portion of the plug has been received in the socket.

With respect to the plug, the blocking valve comprises an annular disk having an outer periphery and flange portion, and flow by vanes, respectively, in sealed and abutted relation to the forward opening and a frusto-conical shoulder of the plug. In the plug, a spring seats against a fixed retention member and biases the disk forwardly into the sealed relation. The socket comprises a chamber sized to receive a series of nested parts for positioning seals relative to the socket housing, a valve member movable relative to the seals, and a spring for normally biasing the socket valve forwardly and into sealed relation.

The seal holding part arrangement is used to contain the socket blocking valve, bushings, and elastomeric seals within the axial bore of the socket housing upon the removal of the plug.

Advantageously, provision of separate shut-off valves on individual connector members blocks the release of fluid media from each of the individual members until the members are sealed, even though the members are not retained to each other.

Advantageously, provision of the sealing means in the socket acts to prevent fluid leakage when the plug and socket conduits are connected and retained and the fluid begins to flow. Although the sealing means remains in the socket conduit upon the separation of the conduits, the sealing means can be easily removed from the socket for inspection or replacement by the use of a means to retain the parts in the socket housing.

BRIEF DESCRIPTION OF THE DRAWINGS

Additional objects, advantages and features of the present invention will become apparent from the following description and appended claims, taken in conjunction with the accompanying drawings, in which:

DETAILED DESCRIPTION OF THE PREFERRED EMBODIMENT

FIGS. 1–5 illustrate various preferred exemplary embodiments of the present invention in a quick connect fitting assembly for sealing a pair of cylindrical fluid conduits to one another and in fluid communication therebetween. As will become apparent to one skilled in the art from the following discussion, the principles of the present invention illustrated by the exemplary embodiments depicted in the drawings are equally applicable to fluid systems, fluid conduits, and fluid fitting or coupling assemblies of shapes, configurations or types other than those shown for the purposes of illustration in the drawings.

Figure 1:
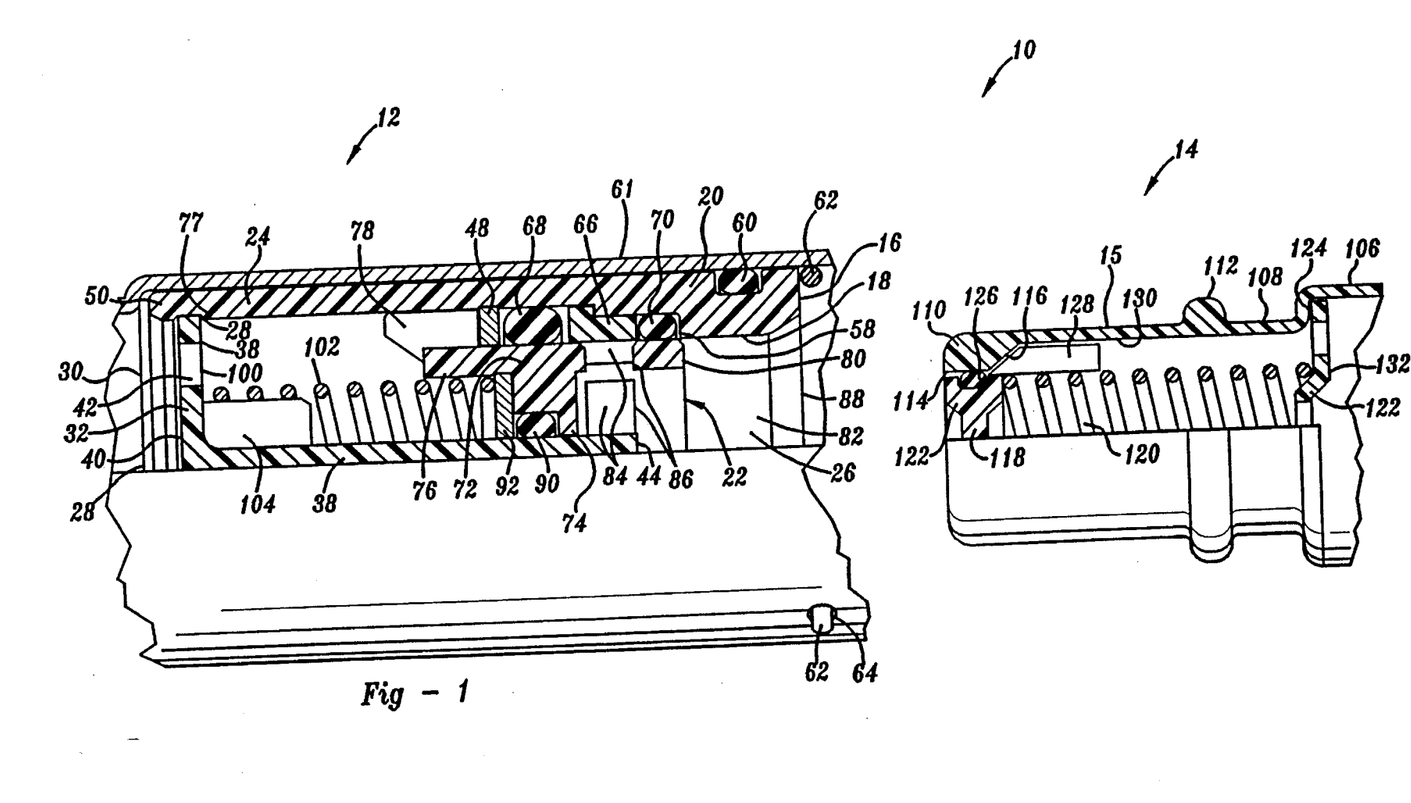
FIG. 1 is a side elevation view, partially in section, of a pair of fluid conduits positioned for mating.
Figure 2:
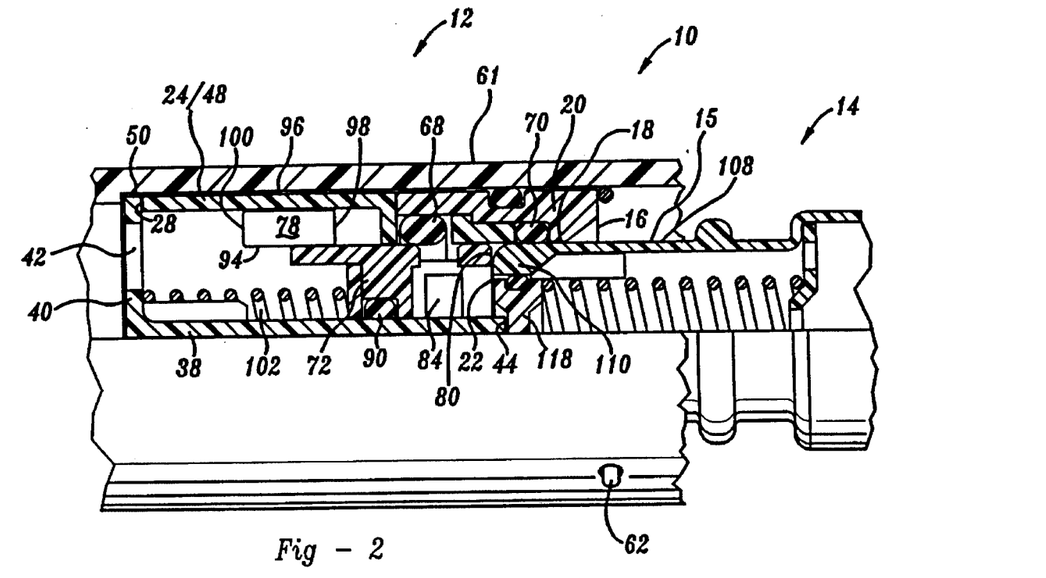
FIG. 2 is a side elevation view, partially in section, showing the fluid conduits of FIG. 2 when partially mated.
Figure 3:
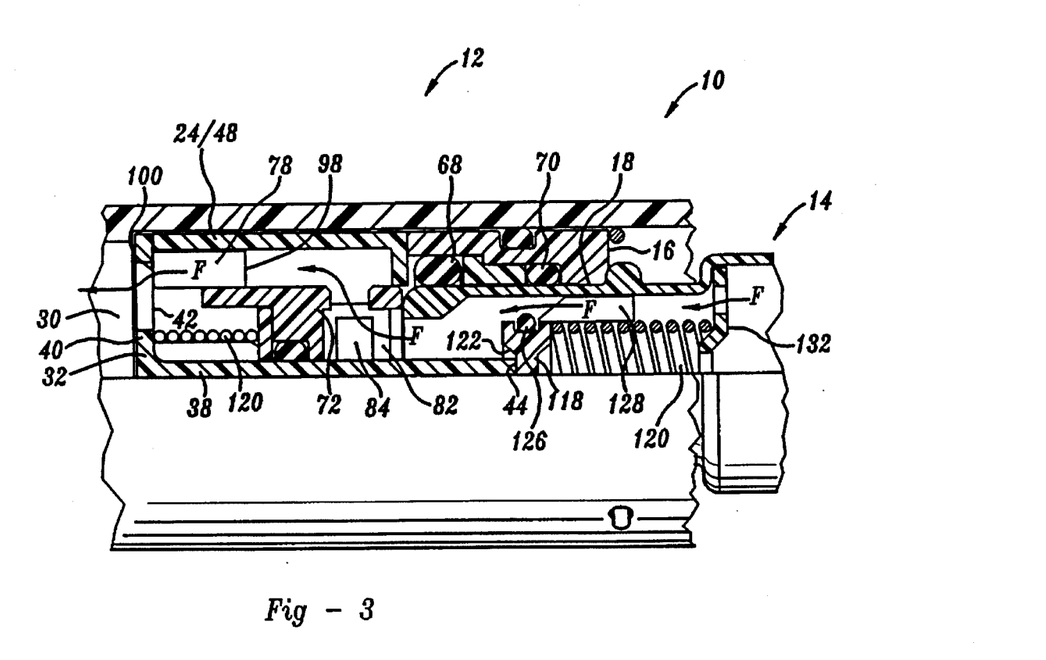
FIG. 3 is a side elevation view, partially in section, showing the fluid conduits of FIG. 1 when fully mated. The means of retaining the two members together is not shown.

Referring primarily to FIGS. 1, 2 and 3, in accordance with one preferred embodiment of the present invention, a quick connect fluid coupling assembly 10 is provided for releasably sealing a socket fluid conduit 12 and a plug fluid conduit 14 to one another to establish fluid communication therebetween. The plug conduit 14 is axially aligned with and longitudinally inserted into the socket conduit 12 to be retained therewithin. While not shown, upon insertion, a retention element would operate to releasably lock the -conduits together as well as allow rotation of the plug relative to the socket. For example, the retention element could be located in an enlarged forward end portion of the socket housing and be provided with resilient fingers that engage the plug. These retention systems are known by those skilled in the art.

The socket fluid conduit assembly 12 includes a housing member 16 having an interior chamber 18 to receive the plug conduit, a seal retainer portion 20 and a blocking valve 22. The housing member 16 includes an elongated cylindrical wall 24 that extends longitudinally from an inlet 26 at one end, and an end wall 28 at the other end, the end wall having an opening 42 to pass fluid outwardly of the chamber at 30. In FIGS. 2 and 3, the elongated part is shown as 24/48. The chamber 18 is dimensioned to receive and position the seal retainer portion 20 and blocking valve 22 in partially nested tandem relation.

The housing member 16 includes a mounting area for seals 60, 68 and 70. Bushing part 66 is nested in housing member 16, and separates seals 68 and 70. Housing member 16 also receives snap-in washer 48 or extended member 24/48 which acts as a stop for seal 68 and as a stop for part 78. At the most interior end of housing member 16 is an area 50 that is heat staked or is configured to snap-in part 32 which carries moving valve body 72. The stem of part 38, which causes valve 118 to open as the plug and socket are mated, is also sealed to moving socket valve 72 by means of seal 90. Stem part 38 includes a radially outward flange 40 with at least one opening 42 therethrough. Flange 40 is positioned by area 50 at the inner most end of housing member 16 by step or end area 28.

Housing member 16, and its associated elements 24, 28 slips into a housing shown by housing wall 61 and is retained position by a housing wall innermost stopping wall 30, and an installable clip 62, which is installed through housing wall 61 at openings 64. Fluid passes out of the socket area through the interior of 30.

The socket shown in FIG. 1 is in the closed to fluid flow position. The outer surface of sliding valve body 72 is sealed by seal 68 and to stem part 38 by seal 90. Seal 90 is inwardly positioned by washer 92 which is snapped into moving valve body 72, and washer 92 also acts to restrict the expansion of spring 102 which is restricted from expanding by flange 40 which is a part of stem part 38. Fins 104 function to maintain spring 102 coaxial of the assembly, and fins 78, which are a part of moving valve body 72, limit outward travel of valve body 72 by impinging on washer 48. The frontal area of moving valve body 72 is shown by the number 80, and the exterior of area 80 is positioned in seal 70 to maintain the inside diameter of seal 70 during times when the plug 14 and socket 12 are not mated.

The plug portion 15 of the plug 14 and socket 12 combination 10, is composed of an outer surface 108 that is adapted to open the sliding valve body 72 in the socket portion 12, and to also be sealed by seals 68 and 70 in the socket portion 12. The end of surface 108 denoted by number 110 is rounded or chamfered to facilitate entry into socket 12 and seals 68 and 70. Also shown on surface 108 is expanded diameter 112 to facilitate retaining plug 14 and socket 12 in a mated relationship. The end 110 of plug 14 pushes on end 80 of moving valve body 72 thereby opening the socket 12 valve. The end 44 of stem 38 pushes on plug 14 valve body 118 thereby opening the plug 14 valve.

The interior of plug 14 is hollow and has interior surface 130. Interior surface 130 consists of surface 114 at the end which is sealed by seal 126, opening up in diameter to chamfered surface 116, which acts as a lead-in for seal 126, and stops the outward movement of fins 128 which are part of plug moving seal body 118. Interior surface 130 provides a guide for fins 128, and the more interior of surface 130 provides a stopping larger inside diameter to provide wall 124. Wall 124 prevents movement of part 132 toward the end of plug 14, and is prevented from movement in the other direction by the end of a hose that is not shown in the view.

Spring 120 is compressed between part 132 and chamfered surface 116 and fins 128, which are adapted for fluid flow therethrough, and urges moving seal body 118 toward the open end of plug 14.

FIG. 2 shows a partial insertion of plug 14 into socket 12. The end 110 of plug 14 has contacted front surface 80 of socket moving valve body 72, and partially opened the valve in the socket. Note that seal 70 has sealed the end of plug 14 in socket 12, but stem 38 has not contacted plug 14 moving valve body 118.

At this point the valve in the socket 12 is not opened because seal 68 is still sealing moving socket 12 valve body 72, and the end of stem 38 part at 44 has not yet opened the plug 14 valve body 118.

There is a small bubble of air now trapped between the sealed end of plug 14 and the interior open end area of socket 12 moving valve body 72. When the mated, socket 12 and plug 14 will have open interior valves, and the small amount of air is "digested" by the fluid system, which is not shown. When the assembly 10 is disconnected, the bubble of air will have been replaced by fluid, and that small amount of fluid will wet the interior open end of socket 12.

FIG. 3 shows full insertion of plug 14 into socket 12. Plug 14 is now sealed to socket 12 by both of seals 68 and 70. Stem part 38 end 44 has now contacted valve body 118 and caused it to move to the open position. The end of the plug has moved valve body 72 to an open position now the path for the fluid flow, F is open to allow flow F from the plug 14 through the socket 12.

The flow F is shown from the plug 14 through the socket 12. The flow F enters plug 14 through the openings of part 132, continues between fins 128, continues by the opening created in the interior of plug 12 when stem 38 end 44 pushed against surface 122 which is the end portion of plug 14 valve body 118, compressing spring 120. The flow F through the sealing bore defined by surface 114, into the interior area of socket moving valve body 72, and through openings 84 in valve body 72 into the interior of the socket 12 that was created when the end of plug 14 moved valve body 72, and then between fins 78 of valve body 72, and out of socket 12 through openings 42 in flange 40 of stem 38.

Fins 78 prevent over opening of the socket 12 by being stopped by surface 100 of fins 78 and flange 40 of stem 38.

Figure 4:
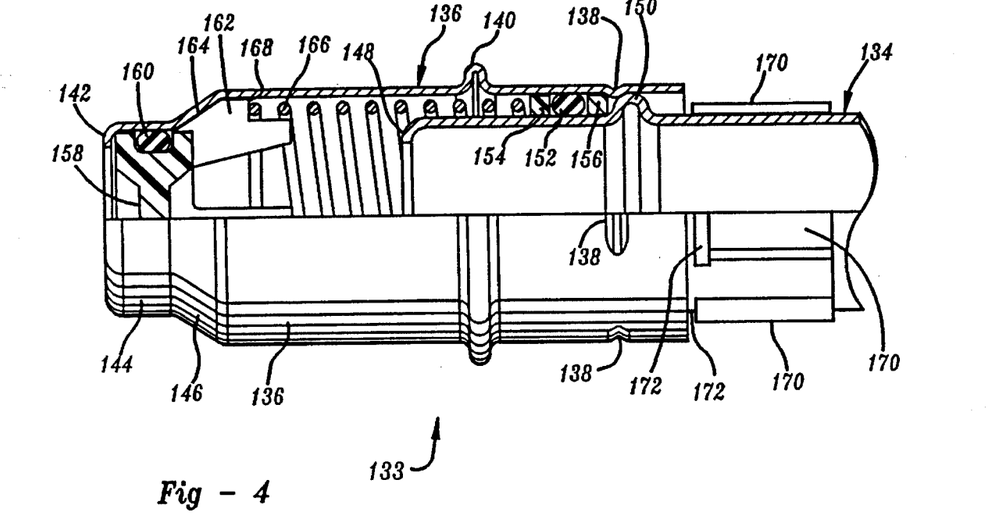
FIG. 4 is a side elevation view, partially in section, of an alternate embodiment of a plug fluid conduit.
Figure 5:
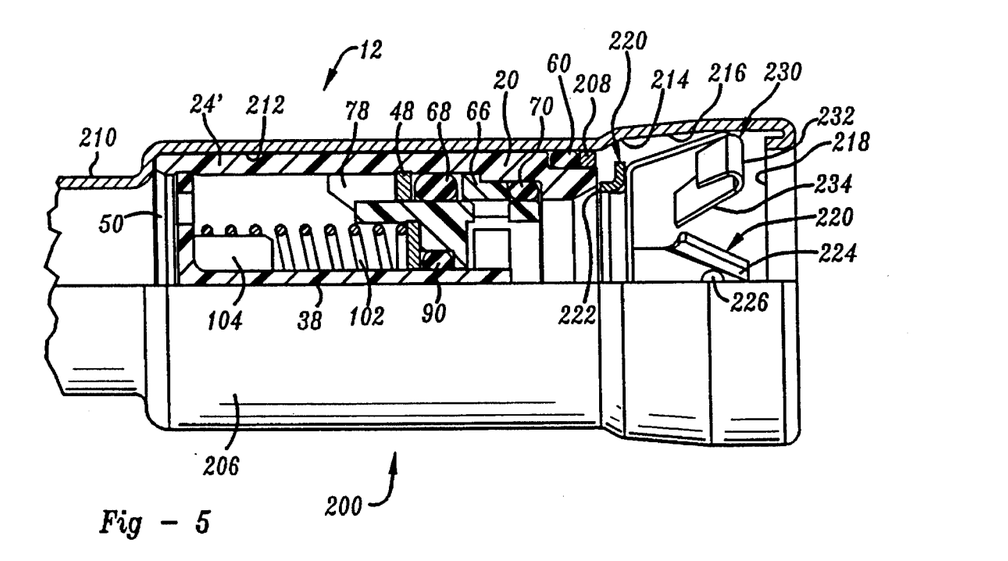
FIG. 5 is a side elevation view, partially in section, showing a portion of a socket and alternate retention of the internal parts, and means of retaining the two members together.

FIG. 4 illustrates a second preferred embodiment of a plug fluid conduit in accordance with this invention. Plug fluid conduit 133 comprises inner and outer housings 134 and 136 telescoped together, each housing being generally cylindrical, and the assembly being open at its opposite ends for passing fluid. The outer housing 136 includes an inwardly extending annular forming 138 for securing the two housings in relative position and preventing axial rearward movement of the outer housing relative to the inner housing 134 by being formed on each side of bead 150 of housing 134. An outwardly extending annular bead 140 which provides a means of attachment between the plug and socket, such as shown in FIG. 5. Additional stabilization of 136 may be gained by squeezing sections 170 of 136 around 134. Notched out sections 172 allow this squeezing. The outer housing 136 is configured for insertion into the socket 200 with the forward end portion of the housing wall 136 being formed to include a decreased radial diameter portion 142 which is configured for entering the socket member, a cylindrical portion 144, and a frusto-conical portion 146 toward housing 134, away from portion 142.

The inner housing 134 is formed to include a reduced diameter portion 148, and an annular bead 150 to engage the formings 138. The inner housing 134 also is stabilized and sealed to the outer housing 136 by an annular seal 152 and by a pair of annular bushings 154 and 156. The bushings and seal are located between the inner and outer housings to prevent the flow of fluid therebetween and the bushings are located on each adjacent side of the seal to prevent movement of the seal in the axial direction.

A blocking valve body 158, similar to that described above for the plug conduit 14, is disposed in abutted relation against the portion 164 by fins 162 of blocking valve body 158. The blocking valve body 158 mounts seal 160, which seals the interior of housing 136, and includes fin like structures 162. Fin structures 162 act to restrain body 158 from being urged outward of housing 136 by contacting the interior 164 of frusto-conical wall 146.

A coil spring 166 is located between the inner and outer housing walls to provide a means of biasing the blocking valve into a forward position thus sealing housing member 136. The spring coils are disposed between the inner and outer conduits with one end of the spring engaging an end face 168 of the fin structures 162 and the other end engaging the bushing 154.

The operation will now be described briefly and particularly in connection to the fluid connector assembly of FIGS. 1–3. In FIG. 1, the plug conduit 14 is spaced from the socket conduit 12. The blocking valve bodies 72 and 118 are both in their first and closed position. No fluid will pass.

In FIG. 2, the plug is partially longitudinally inserted within the socket housing whereupon the seal 70 is radially compressed against the outer periphery of the plug. The front end of the plug is engaging the front axial face 80 of the moving valve body 72, and partially opening the socket 12 which is still sealed to flow. Further, the end face 44 of stem part 38 of the socket valve enters the recess formed on the front face of the plug valve body 118, but does not yet cause opening to flow of plug 14. No fluid will pass, but plug 14 is sealed into socket 12, but not retained.

As shown in FIG. 3, the plug is driven further into the socket, the end face 44 of stem part 38 urges the plug moving seal body 118 to the right in FIG. 3, thereby causing the plug spring 120 to compress. When this happens the seal 126 that is mounted on body 118 is driven inwardly and removed from its sealing engagement with the inner surface 114 of the plug. Simultaneously, the front end 110 of the plug drives the collar 80, and thus the body 72 of the socket valve, axially towards the left and in a direction inward of the housing thus opening the socket 12 to flow. Seal 90 always seals moving body 72 to stem 34. The spring 102 becomes compressed between against the flange 40 of the stem part 38 and the washer 92. In addition, the spring 120 which abuts valve body 118 becomes more compressed and the valve opens. When both the male and female blocking valves open, fluid can flow from the male member, through passage 82 and 84, and into the female member.

FIG. 5 shows the socket portion 12 of the connection disposed within a connector housing 206. Housing 206 is adapted to be attached to a tubular member (not shown) at 210. Housing wall 24' is similar to wall 24 in FIG. 1. The inner housing surface 212 is adapted to receive the socket 12 inner parts, and to prevent a cam closing line in the mold, the front outer section of housing 20 has been adapted to receive a ring-like part 208. The operation of the socket 12 is the same as described above. The connector housing 200 interior is also shaped to provide surfaces 214, 216 and 218. The 214, 216 and 218 interior surfaces receive a retaining member 220 for retaining the internal socket 12 parts in connector housing 206, and a second retainer 230 for locking the plug 14 into engagement with socket 12. Retaining member 220 abuts surface 218 of housing 206 with portions 224 and area 222 and ring 208, and holes 226 assist in the removal of retaining member 220. Retaining member 230 also abuts housing 206 surface 218 at 232, and is formed with a portion or portions 234 which spring open to accept the larger diameter 112 in FIGS. 1–3, and 140 in FIG. 4. After passing by the end of portion 234, portion or portions 234 spring back behind raised diameters 112 or 140 to retain the plug in the socket.

The seals in the above discussion are made from elastomeric material, and all of the other parts may be made of an appropriate metal or plastic material.

What is claimed is:

1. A connector assembly for providing a quick connection, comprising:

a tubular male conduit adapted to convey fluid and for providing a blocking wall portion disposed transversely to the central axis of said male conduit;

male blocking valve means having an axial bore therein for receiving said tubular conduit, means disposed in said bore for providing a seal between said tubular male conduit and said male blocking valve means, means provided on said male blocking valve means to seal said tubular male conduit, spring means to bias said male blocking valve means in a stop fluid flow position;

a female housing having axial bore means therein for receiving said male blocking valve means at a first end, means disposed in said axial bore means for providing a seal between said male blocking valve means and said female housing, means that cooperate with said tubular male conduit to lock said female housing to said tubular male conduit and said male blocking valve means, and means including a solid pin to cause said male blocking valve means to open;

female blocking valve means encased within said female housing such that upon insertion of said male blocking valve means into said female housing, an end portion of said tubular male conduit opens said female blocking valve means by causing compression of spring means that biases said female blocking valve means to a stop fluid flow position and the solid pin opens the male blocking valve means, said male blocking valve means being sealed to said female housing prior to the opening of said male and female blocking valve means.

2. The connector assembly according to claim 1 wherein said axial bore means provides an enlarged first diameter portion at said first end of said female housing, and a reduced second diameter portion at a second end of said female housing.

3. The connector assembly according to claim 2 wherein said female blocking valve means are disposed in said second diameter portion of said axial bore means.

4. The connector assembly according to claim 3 wherein said second diameter portion is reduced to merge with a piping system.

5. The connector assembly according to claim 4 wherein said reduced second diameter portion forms a collar which abuts said female blocking valve means when said male blocking valve means is fully inserted into said female housing.

6. The connector assembly according to claim 1 wherein a retainer includes arm portions which abut an incurved flange portion of said female housing.

7. The connector assembly according to claim 6 wherein a tubular male conduit retainer has inwardly projecting fingers which upon complete insertion of said male blocking valve means engage an outwardly projecting annular surface means of said male blocking valve means to prevent undesired withdrawal.

8. The connector assembly according to claim 7 wherein said tubular male conduit retainer has a plurality of release tabs which protrude out from the axial bore of said female housing to provide a mechanism for quickly releasing said male blocking valve means.

9. The invention as set forth in claim 1 which further includes seal retainer means, wherein said seal retainer means is demountably coupled to a first end of said female housing to hold in a plurality of bushings, sealing rings and said female blocking valve means upon withdrawal of said male blocking valve means.

10. The invention as set forth in claim 1 wherein said male blocking valve means is sealed within said female blocking valve means prior to opening of said male blocking valve means.

11. A connector assembly, comprising:

a tubular conduit adapted to convey fluid having an outwardly projecting annular surface formed at predetermined distance from an end of said conduit, said projecting annular surface providing a blocking wall portion disposed transversely to a central axis of said conduit;

a housing having axial bore means formed therein for receiving said conduit at a first end and for providing a fluid path at a second end, said housing including a first portion having an enlarged diameter portion and a second portion having a reduced diameter portion, said first and second diameter portions being connected by a tapering transitional portion;

elastomeric ring means disposed in said axial bore means for providing a seal between said conduit and said housing;

annular bushing means disposed in said axial bore means for positioning said elastomeric ring means and for guiding the insertion of said conduit into a sealing engagement with said elastomeric ring means;

spring means disposed in said axial bore means; and check valve means disposed in said axial bore means, said check valve means being operable to selectively preclude fluid from leaving said housing, said check valve means comprising a continuous ring operable to compress said spring means and a sealing ring carrier engaged by a sealing ring and connected to said continuous ring by at least one coupling member.

12. The connector assembly according to claim 11, wherein said sealing ring carrier further comprises an annular groove disposed transversely to said axial bore means for hosting said sealing ring, said sealing ring demountably coupled within said annular groove being operable to provide a seal between said sealing ring carrier and said housing.

13. The connector assembly according to claim 12, wherein said sealing ring carrier includes a front wall having a centrally located recessed portion.

14. The connector assembly according to claim 11, wherein said housing is provided with inwardly projecting annular ring means for stabilizing said annular bushing means.

15. The connector assembly according to claim 14, wherein said annular bushing means is provided with an annular channel disposed transversely to said axial bore means, said annular channel substantially corresponding to said inwardly projecting annular ring means.

16. The connector assembly according to claim 15, wherein said annular bushing means comprises at least one annular bushing.

17. The connector assembly according to claim 16, wherein said annular bushing means comprises two annular bushings.

18. The connector assembly according to claim 15, wherein said inwardly projecting annular ring means comprises at least one inwardly projecting annular ring.

19. The connector assembly according to claim 18, wherein said inwardly projecting annular ring means comprises two annular rings.

20. The connector assembly according to claim 9, wherein said housing further includes a crimped portion, said crimped portion being operable to lock said conduit within said housing.

21. The connector assembly according to claim 20, wherein said crimped portion partially abuts said blocking wall of said tubular conduit.

22. The connector assembly according to claim 11, wherein the diameter of said continuous ring of said check valve means approximately corresponds to the diameter of said spring means.

23. In a connector assembly for providing a quick connection, having a tubular conduit adapted to convey fluid and formed with an annular projection disposed a predetermined distance from the leading end of said conduit, the improvement comprising:

a housing having an axial bore formed therein for receiving said conduit at a first end and for providing a fluid path at a second end, said housing including a first portion having an enlarged diameter and a second portion having a reduced diameter, said first and second diameter portions being connected by a tapering transitional portion;

elastomeric ring means disposed in said axial bore means for providing a seal between said conduit and said housing;

annular bushing means disposed in said axial bore means adjacent to said elastomeric ring means;

spring means disposed in said axial bore means; and check valve means disposed in said axial bore means, said check valve means being operable to selectively preclude fluid from leaving said housing, said check valve means comprising a continuous ring wherein the outside diameter of said continuous ring substantially corresponds to the inside diameter of said first portion of said housing and a sealing ring carrier engaged by a sealing ring, said sealing ring carrier being connected to said continuous ring by a plurality of coupling members.

24. The invention according to claim 23, wherein said sealing ring carrier includes an annular groove disposed transversely to said axial bore means for hosting said sealing ring, said sealing ring being mounted within said annular groove operable to provide a seal between said sealing ring carrier and said housing.

25. The connector assembly according to claim 23, wherein said housing is provided with inwardly projecting annular ring means for stabilizing said annular bushing means.

26. The connector assembly according to claim 25, wherein said annular bushing means is provided with an annular channel disposed transversely to said axial bore means, said annular channel substantially corresponding to said inwardly projecting annular ring means.

27. The connector assembly according to claim 26, wherein said annular bushing means comprise a pair of annular bushings.

* * * * *

UNITED STATES PATENT AND TRADEMARK OFFICE
CERTIFICATE OF CORRECTION

PATENT NO. : 5,546,985
DATED : August 20, 1996
INVENTOR(S) : Donald D. Bartholomew It is certified that error appears in the above-indentified patent and that said Letters Patent is hereby corrected as shown below:

[57] Abstract, Line 4, "seal 68,70" should be --seal 68, 70--

[57] Abstract, Line 6, after "each" insert --of--

[57] Abstract, Line 7, "portion" should be --portions--

[57] Abstract, Line 11, after "each" insert --of--

[57] Abstract, Line 12, "portion" should be --portions--

Col. 1, line 54, delete "diameter"

Col. 3, line 19, "-conduits" should be --conduits--

Col. 3, line 53, after "retained" insert --in--

Col. 4, line 53, after "position" insert --and--

Col. 4, line 54, "flow, F" should be --flow F--

UNITED STATES PATENT AND TRADEMARK OFFICE
CERTIFICATE OF CORRECTION

PATENT NO. : 5,546,985                     Page 2 of 2
DATED : August 20, 1996
INVENTOR(S) : Donald D. Bartholomew It is certified that error appears in the above-indentified patent and that said Letters Patent is hereby corrected as shown below:

Col. 4, line 59, "plug 12" should be --plug 14--

Col. 5, line 11, after "outer housing" insert --136--

Col. 5, line 13, delete "which"

Col. 6, line 8, delete "against"

Col. 6, line 23, "214,216" should be --214, 216--

Col. 8, line 38, Claim 20, "Claim 9" should be --Claim 11--

Signed and Sealed this

Twenty-fourth Day of December, 1996

Attest:

BRUCE LEHMAN

Attesting Officer      Commissioner of Patents and Trademarks